United States Patent [19]

Prusas et al.

[11] Patent Number: 4,888,092

[45] Date of Patent: Dec. 19, 1989

[54] PRIMARY PAPER SHEET HAVING A SURFACE LAYER OF PULP FINES

[75] Inventors: Zenon Prusas; L. Oscar Uhrig; Gene W. Wisecup, all of Chillicothe, Ohio

[73] Assignee: The Mead Corporation, Dayton, Ohio

[21] Appl. No.: 99,583

[22] Filed: Sep. 22, 1987

[51] Int. Cl.[4] .......................... D21H 5/12; B32B 29/02

[52] U.S. Cl. .................................... 162/130; 162/135; 162/149; 428/326; 428/535; 428/537.5

[58] Field of Search ............... 162/141, 149, 130, 135, 162/137; 428/914, 537.5, 534, 535, 321.5, 326; 427/146, 150, 153

[56] References Cited

U.S. PATENT DOCUMENTS

| | | | |
|---|---|---|---|
| 2,098,733 | 11/1937 | Sale | 162/130 |
| 2,881,669 | 4/1959 | Thomas | 162/130 |
| 3,565,753 | 2/1971 | Yurkowitz | 162/130 |
| 3,839,144 | 10/1974 | Louden | 162/141 |
| 4,060,450 | 11/1977 | Palazzolo et al. | 162/141 |
| 4,300,981 | 11/1981 | Cartens | 162/130 |
| 4,567,496 | 10/1986 | Ogata etal. | 162/76 |

OTHER PUBLICATIONS

Casey; *Pulp and Paper,* 2nd Ed., vol. 1, Interscience Publishers, N.Y. 1960.

Perry; *Chemical Eng. Handbook,* 4th ed. McGraw-Hill, N.Y., 1963, table 21-16.

*Primary Examiner*—Steve Alvo

*Attorney, Agent, or Firm*—Smith & Schnacke

[57] ABSTRACT

A paper sheet comprising a primary sheet having a layer of pulp fines on a surface thereof. The disclosed paper sheet has improved smoothness and hold out, and is particularly useful in carbonless record sheets and as a basesheet for high quality coated papers.

15 Claims, 1 Drawing Sheet

PRIMARY PAPER SHEET HAVING A SURFACE LAYER OF PULP FINES

BACKGROUND OF THE INVENTION

The present invention relates to a paper sheet, and more particularly, to a paper sheet useful a basesheet for high quality coated papers or in carbonless record sheets. More particularly, it relates to a sheet comprising a primary sheet having a layer of pulp fines on at least one surface thereof.

Pulp fines comprise ray cells, parenchyma cells, fibrils, and fibers. Ray cells are short cells which are chiefly parenchymatous and make up the wood ray. The wood ray is the ribbonlike strand of tissue extending in a radial direction across the annual rings of the wood structure.

Fines account for about 10 to 20% of the material in a hardwood Kraft pulp. They have little value for papermaking purposes because they appear in the pulp as very short, thin-walled fragments. Fines reduce pulp strength to a significant degree, inhibit drainage, reduce one pass retention on paper machine wire, and also cause pitch deposits.

The paper industry has frequently sought better applications for fines. U.S. Pat. No. 4,547,263 teaches that parenchyma cells are useful in the manufacture of pressed board, charcoal briquettes, pressed granules for activated carbon, and as refuse derived fuel for boilers.

SUMMARY OF THE INVENTION

A principal object of the present invention is to provide a paper sheet having enhanced smoothness and strength, and higher hold out.

Another object of the present invention is to provide a more productive application for fines.

The present invention provides a paper sheet comprising a primary sheet having a layer of pulp fines on a surface thereof. It has been found that a noticeable improvement in sheet smoothness, hold out (as measured by Gurley porosity), and sheet strength accompanies the addition of a layer of fines to the surface of a primary sheet. The fines plug the pores of the paper sheet and smooth the surface of the paper sheet. As such, paper sheets prepared in accordance with the invention are desirable as base sheets for high quality coated papers and in other applications where these properties may be desirable. These sheets are also particularly useful in the carbonless paper area as a basesheet for the developer sheet (CF sheet) or the microcapsule sheet (the CB sheet).

Thus, in one embodiment, the present invention provides a two-ply sheet comprising a primary sheet having a layer of pulp fines on at least one surface thereof.

DETAILED DESCRIPTION OF THE INVENTION

Figure 1:
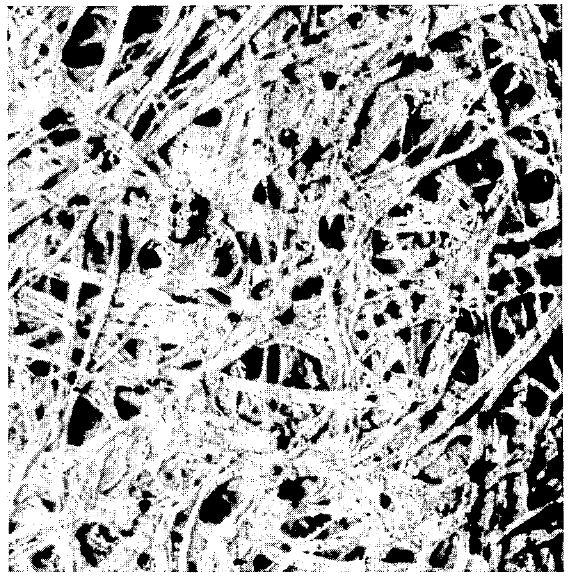
FIG. 1 is a microphotograph (130x) of a primary sheet prior to application of fines in accordance with the present invention.

The term "fines"is used herein to mean ray cells including parenchyma cells, fibrils, and fiber fragments. These fines will generally pass through a 100 mesh screen. If separation of the fines from the pulp is not complete, a small amount of fiber may be present with the fines which are applied to the primary sheet surface.

The pulp fines are separated from the pulp in a conventional manner. The nature of the pulp fines varies depending upon whether the pulp is refined, the nature of the wood, and the manner in which the pulp fines are retrieved from the pulp.

With respect to separating the fines from the pulp, techniques are desirable which yield a higher percentage of fines (rejects) with good separation, e.g., less than 25% fibers and fiber fragments in the fines. This is a function of several factors all of which can be varied to give the optimum balance of yield and separation including the nature of the fractionating equipment, the pulp consistency, screen size, and C.S. Freeness.

While much of the experimentation which formed the basis for this disclosure was done using a Bauer Hydrasieve to separate the fines from the pulp fibers. Other fractionating equipment may be preferred such as a sidehill screen or pressure screens.

It should be understood that an improvement in porosity and surface smoothness can be obtained by applying to the primary sheet surface a screened product containing as little as 50% by weight ray cells with the balance being fibrils, fiber fragments, and fiber. Preferably, however, the screened product contains about 0–25% fiber and fiber fragments and 75–100% ray cells and fibrils, and more preferably, less than 10% fiber fragments and 90–95% ray cells and fibrils.

Fines removed from a highly refined pulp have a different character than fines removed from a less highly refined pulp or an unrefined pulp. Typically, primarily ray cells are removed from the unrefined pulp. Because ray cells are plate-like particles, ray cells alone do not appear to be the most efficient particles for clogging the pores and smoothing the surface of the primary sheet. Fines removed from a refined pulp include fibrils and fiber fragments as well as ray cells. The presence of fibrils and fiber fragments on a primary sheet, in addition to the ray cells, enhances surface smoothness and porosity and improves wax surface pick strength. It has been found that a primary sheet having a layer of refined pulp fines on the surface rather than unrefined pulp fines yields a paper sheet having a higher Gurley porosity. Preferably, the fines are removed from a pulp which has been refined to a C.S. Freeness of about 200 to 400.

Fines removed from an unrefined pulp, can be refined after separation from the pulp using conventional refining equipment, operated preferably at higher pulp consistencies.

The pulp fines are applied to a primary sheet as a slurry in water. The pulp fines can be delivered at consistencies comparable to the consistencies used in papermaking. In many operations, the pulp fines will be applied at approximately the same consistency as the consistency of the primary pulp. Usually, this slurry has a consistency of about 0.5 to 1.0%. If the consistency is too low, the pulp fines can be concentrated to higher consistencies, such as up to about 4%, in a centrifuge and then diluted before depositing on the base sheet or paper machine wire.

The pulp fines are applied to the primary sheet in a conventional manner. The fines can be deposited on the primary sheet from a secondary headbox such as a secondary headbox conventionally used in the manufacture of two-ply paper and paperboard.

The primary sheet can be formed from any conventionally available pulp such as 100% hardwood pulp or a blend of hardwood and softwood pulps. Preferably, the primary sheet is formed from a blend of softwood and hardwood pulps. Sheets produced from blends of softwood and hardwood pulps usually are stronger than sheets produced from 100% hardwood pulp. A useful blend is 55% softwood and 45% hardwood.

The weight ratio between the primary sheet and the fines varies depending upon the surface characteristics which are desired. For higher smoothness and lower porosity, higher amounts of fines are deposited on the surface of the primary sheet. However, as the amount of fines approaches 40% by weight of the paper sheet, the paper sheet begins to drain slowly which slows the papermaking process. Typically, the pulp fines are applied to the primary sheet so that the paper sheet comprises about 10 to 30% by weight pulp fines based on the total weight of the paper sheet. Preferably, the paper sheet comprises about 15 to 25% by weight pulp fines based on the weight of the paper sheet.

In some applications, a three-ply paper sheet may be useful. In other words, the paper sheet comprises a layer of pulp fines on each surface of the primary sheet. With a three-ply paper sheet, the paper sheet comprises about 20 to 60% by weight pulp fines based on the weight of the paper sheet.

Since an object of the present invention is to provide a smooth paper sheet, the present invention can be used in conjunction with conventional techniques including wet pressing, felted dryers, and calendering to enhance surface smoothness.

The paper sheet of the present invention is useful in many applications but is particularly useful as a base sheet in carbonless paper. Currently, microcapsules settle in the crevices and pores in the surface of a paper sheet which is undesirable because these sheltered microcapsules do not rupture when pressure is applied. Because the paper sheet of the present invention exhibits high hold out and surface smoothness, lower capsule coating weights may be used in some cases.

The paper sheet of the present invention is also useful in photographic imaging systems of the type disclosed in U.S. Pat. No. 4,399,209. In these imaging systems the microcapsules are ruptured by passage of an imaging sheet between two pressure rollers in contact with a developer sheet. Any incongruities in the surface of the imaging sheet result in uneven development characteristics and photographic defects. Because the paper sheet of the present invention has high surface smoothness, the paper sheet provides even development and eliminates photographic defects.

The present invention is more fully illustrated by the following non-limiting Examples.

EXAMPLE 1

Unrefined bleached hardwood Kraft pulp was obtained from Chillicothe, Ohio pulp mill of The Mead Corporation. A portion of this pulp was refined in Mead-Bauer laboratory refiner and single-ply handsheets were made on a British handsheet mold using conventional procedures. Another portion of this pulp was screened on a portable screen to separate ray and parenchyma cells and other fibrous fines. The separated material contained less than 10% of fibers and fiber fragments. Fibers retained on the screen were refined in Mead-Bauer laboratory refiner. Two-ply handsheets were prepared using a Sylvester secondary headbox attachment on the British handsheet mold. The bottom ply accounted for 87% of the sheet by weight and consisted of the refined fibers. The top ply (13% by weight) was composed of unrefined ray cells and of other materials separated during pulp screening. Handsheet testing results are shown in Table 1.

TABLE 1

| | Control Single-Ply | Two-Ply Sheet |
|---|---|---|
| CF, Main Layer | 410 | 390 |
| Uncalendered Sheets: | | |
| Tear Factor | 83 | 89 |
| Burst Factor | 41.8 | 45.6 |
| Tensile, b.l.m. | 6956 | 7343 |
| TEA | 6.9 | 7.5 |
| MIT Fold | 163 | 232 |
| OK Wax, Top Side | 13 | 11 |
| Calendered Sheets: | | |
| Gurley Porosity, Secs/100cc | 27 | 41 |
| PPS, Top Side, 10 kgf/cm$^2$ | 4.43 | 4.11 |
| PPS, Top Side, 20 kgf/cm$^2$ | 3.87 | 3.34 |

A noticeable improvement in all sheets strength properties was observed due to separation of ray cells from the pulp and depositing on the surface of the sheet. The sheet also became less porous (shorter time to force 100cc of air through the sheet) and the PPS (Parker Print Surf) value was lowered, indicating a smoother sheet. Sheet surface strength as measured by the wax pick test was lowered somewhat but still remained in an acceptable range.

EXAMPLE 2

A portion of separated ray cells was refined in laboratory PFI refiner at 3000 revolutions and two-ply sheets were made in the same manner as in Example 1. Table 2 illustrates the effect of refining of ray cell portion (13% by weight) in a two-ply construction.

TABLE 2

| Ray Cell Refining | None | Yes |
|---|---|---|
| Uncalendered Sheets: | | |
| Tear Factor | 89 | 83 |
| Burst Factor | 45.6 | 47.3 |
| Tensile, b.l.m. | 7343 | 8128 |
| TEA | 7.5 | 10.4 |
| MIT Fold | 232 | 272 |
| OK Wax, Top Side | 11 | 14 |
| Calendered Sheets: | | |
| Gurley Porosity, Secs/100cc | 41 | 80 |
| PPS, Top Side, 10 kgf/cm$^2$ | 4.11 | 4.35 |
| PPS, Top Side, 20 kgf/cm$^2$ | 3.34 | 3.62 |

A further improvement in all sheet strength properties except tear was observed when the ray cell portion of the sheet was refined. Wax pick test also improved above that of a single-ply sheet shown in Table 1. Gurley porosity value was doubled, indicating a further closing up of the sheet structure. While a slight deterioration in PPS smoothness occurred, it was still better than that of a single-ply sheet (see Table 1).

EXAMPLE 3

A portion of hardwood Kraft pulp described in Example 1 was refined in Mead-Bauer laboratory refiner and fines (18.7% by pulp weight) were separated from this pulp using the same procedure as in Example 1. Two-ply handsheets were made while depositing 18.7% of these fines on top of the base sheet from which these fines were previously removed. A comparison of sheet properties between the single-ply and the two-ply constructions is shown in Table 3.

TABLE 3

| Ray Cell Refining | None | Yes |
|---|---|---|
| Uncalendered Sheets: | | |
| Tear Factor | 83 | 83 |
| Burst Factor | 41.8 | 40.4 |
| Tensile, b.l.m. | 6956 | 7232 |
| TEA | 6.9 | 7.0 |
| MIT Fold | 163 | 174 |
| OK Wax, Top Side | 13 | 13 |
| Calendered Sheets: | | |
| Gurley Porosity, Secs/100cc | 27 | 505 |
| PPS, Top Side, 10 kgf/cm$^2$ | 4.43 | 4.15 |
| PPS, Top Side, 20 kgf/cm$^2$ | 3.87 | 3.30 |

Figure 2:
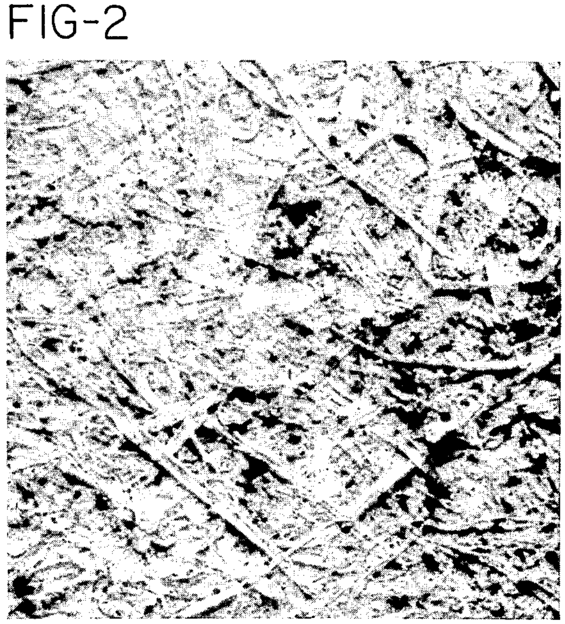
FIG. 2 is a microphotograph (130x) of the base sheet of Example 3.

Compared to Examples 1 and 2, this represents the best result in our attempts to close up the sheet. According to the Gurley porosity value, it took 19 times longer to force 100 cc of air through the two-ply sheet. Surface smoothness was also improved to a somewhat greater degree than in Examples 1 and 2. This can be best illustrated with photomicrographs of FIGS. 1 and 2 showing the surfaces of two- vs. single-ply sheets. The superiority of the two-ply sheet surface is more evident than one would expect from the PPS test values. One can readily see how much it would be easier to cover the surface of the two-ply sheet with carbonless coating emulsion or with clay coating color in coating operations.

Sheet strength properties in this comparison were similar for both single-ply and two-ply sheets.

EXAMPLE 4

In examples 1 through 3 we dealt with excellent ray cell separation, i.e., only a very small proportion of fibers were present in fines fraction. Also, handsheets were made from 100% hardwood pulp. In commercial papermaking operations it is customary to use softwood fibers in blends with hardwood. In addition, ray cell separation in commercial practice may not be as efficient as under laboratory conditions. Thus a comparison was made between single- and two-ply constructions on softwood and hardwood blends using ray cell fraction separated with commercial size equipment. This was done with a 48 inch C. E. Bauer Hydrasieve having 0.020" slotted screens. Hardwood kraft pulp was first refined in a Jones pilot plant disc refiner before screening. The ray cell fraction contained about 25% of fibers and fiber fragments (i.e., material which would be retained on 28, 48 and 100 mesh screens in a Bauer-McNett fiber classification test). The two ply sheet construction consisted of 15% top layer and 85% primary layer.

TABLE 4

| | Control Single-Ply | Two-ply Sheet |
|---|---|---|
| Furnish, Primary Layer: | | |
| Northern Softwood Kraft, % | 50 | 55 |
| Appalachian Hardwood Kraft, % | 50 | 45 |
| C.F. Freeness of Blend | 430 | 450 |
| Uncalendered Handsheets: | | |
| Bulk, cc/g | 1.54 | 1.54 |
| Tear Factor | 109 | 107 |
| Burst Factor | 55.9 | 59.5 |
| OK Wax Pick, Top Side | 12 | 13 |
| Gurley Porosity, Sec/100 cc | 42 | 119 |

TABLE 4-continued

| | Control Single-Ply | Two-ply Sheet |
|---|---|---|
| Calendered Handsheets: | | |
| Bulk, cc/g | 1.15 | 1.23 |
| Gurley Porosity, Secs/100cc | 82 | 219 |
| PPS, Top Side, 10 kgf/cm$^2$ | 4.74 | 4.43 |
| PPS, Top Side, 20 kgf/cm$^2$ | 4.25 | 3.85 |

The results in Table 4 indicate that a significant improvement in closing up of the sheet (as measured by Gurley porosity) and in sheet surface uniformity (PPS values) was achieved even when coarser softwood kraft fibers were used in the furnish and when ray cell separation on the hardwood kraft component was less efficient. The gain in sheet strength was less noticeable, probably due to the fact that the content of much stronger softwood fibers was somewhat lower in the two-ply sheet (46.75 vs. 50% based on total sheet).

Having described the invention in detail and by reference to preferred embodiments thereof, it will be apparent that modifications and variations are possible without departing from the scope of the invention defined in the appended claims.

What is claimed is:

1. A paper sheet comprising a primary paper sheet having a layer of pulp fines on the surface thereof, said pulp fines having a particle size which passes through a 100 mesh screen, containing less than 25% fiber and fiber fragments, and containing at least 50% by weight ray cells.

2. The paper sheet of claim 1 wherein said pulp fines are hardwood fines.

3. The paper sheet of claim 2 wherein said pulp fines are obtained from a pulp refined to a C.S. Freeness of about 200 to 400.

4. The paper sheet of claim 3, wherein said paper sheet comprises about 10 to 25% by weight pulp fines based on the total weight of said paper sheet.

5. The paper sheet of claim 4 wherein said paper sheet comprises about 15 to 25% by weight pulp fines based on the weight of said paper sheet.

6. The paper sheet of claim 5 wherein said primary sheet is formed from a pulp containing softwood and hardwood fibers.

7. The paper sheet of claim 1 wherein said paper sheet comprises a layer of pulp fines on each surface of said primary sheet.

8. The paper sheet of claim 7 wherein said paper sheet comprises about 20 to 60% by weight pulp fines based on the weight of said paper sheet.

9. The paper sheet of claim 1 wherein said pulp fines contain 75–100% ray cells and fibrils.

10. The paper sheet of claim 9 wherein said pulp fines contain 90 to 95% ray cells and fibrils.

11. A recording sheet comprising a primary sheet having a layer of pulp fines on the surface thereof, said fines having a particle size which passes a 100 mesh screen, containing less than 25% fiber fragments and containing at least 50% ray cells, and a layer of microcapsules overlaying said layer of pulp fines.

12. The recording sheet of claim 11 wherein said pulp fines are hardwood fines.

13. The recording sheet of claim 12 wherein said pulp fines are obtained from a pulp refined to a C.S. Freeness of about 200 to 400.

14. The recording sheet of claim 11 wherein said pulp fines contain 75–100% ray cells and fibrils.

15. The recording sheet of claim 14 wherein said pulp fines contain 90 to 95% ray cells and fibrils.

* * * * *